United States Patent
Haring et al.

(10) Patent No.: US 10,415,646 B2
(45) Date of Patent: Sep. 17, 2019

(54) TELESCOPING ROLLER I-SHAFT AND METHOD OF ASSEMBLY

(71) Applicant: STEERING SOLUTIONS IP HOLDING CORPORATION, Saginaw, MI (US)

(72) Inventors: Shawn A. Haring, Swartz Creek, MI (US); Gregory D. Brezinski, Freeland, MI (US); Chase A. Szostak, Saginaw, MI (US); Carl R. Castanier, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1 day.

(21) Appl. No.: 15/267,245

(22) Filed: Sep. 16, 2016

(65) Prior Publication Data
US 2018/0079444 A1    Mar. 22, 2018

(51) Int. Cl.
| | |
|---|---|
| *F16D 3/06* | (2006.01) |
| *F16C 3/035* | (2006.01) |
| *F16C 19/54* | (2006.01) |
| *B62D 1/16* | (2006.01) |
| *B62D 1/20* | (2006.01) |

(52) U.S. Cl.
CPC .............. *F16D 3/065* (2013.01); *B62D 1/16* (2013.01); *B62D 1/20* (2013.01); *F16C 3/035* (2013.01); *F16C 19/54* (2013.01); *F16C 2326/01* (2013.01)

(58) Field of Classification Search
CPC ...... F16C 19/543; F16C 35/067; F16C 3/035; B62D 1/185; F16D 3/065
See application file for complete search history.

(56) References Cited

U.S. PATENT DOCUMENTS

| | | | | |
|---|---|---|---|---|
| 7,416,216 | B2 * | 8/2008 | Shoda ................... | B62D 1/185 280/775 |
| 9,206,848 | B2 * | 12/2015 | Fujikake ............. | F16C 33/6607 |
| 9,958,015 | B2 * | 5/2018 | Mondragon ........... | F16D 3/065 |
| 2010/0210370 | A1 * | 8/2010 | Kwon ...................... | B62D 1/16 464/180 |
| 2016/0369835 | A1 * | 12/2016 | Kurokawa ............. | B62D 1/185 |

(Continued)

FOREIGN PATENT DOCUMENTS

| | | | | |
|---|---|---|---|---|
| DE | 10057861 | A1 * | 5/2002 | ............... A61C 1/05 |
| DE | 102014101194 | A1 * | 8/2015 | ............. F16C 3/035 |

(Continued)

*Primary Examiner* — Nicole T Verley

(57) ABSTRACT

A roller I-shaft includes an inner shaft, a hollow outer member, and a plurality of bearings. The inner shaft extends along an axis, and includes an outward face defining a plurality of first and second grooves that both extend axially and are alternately spaced circumferentially from one-another. The outer member is disposed radially outward from the inner shaft and includes an inward surface defining a plurality of first channels substantially aligned with the plurality of first grooves, and a plurality of second channels substantially aligned with the plurality of second grooves. The first grooves and the first channels form a plurality of first bearing races, and the second grooves and the second channels form a plurality of second bearing races. The plurality of bearings are disposed in a selected plurality of bearing races comprising one of the plurality of first bearing races and the plurality of second bearing races.

14 Claims, 5 Drawing Sheets

(56) References Cited

U.S. PATENT DOCUMENTS

| | | | |
|---|---|---|---|
| 2017/0036690 A1* | 2/2017 | Jager | B62D 1/185 |
| 2017/0158220 A1* | 6/2017 | Appleyard | B62D 1/185 |
| 2017/0232994 A1* | 8/2017 | Sakuda | B62D 1/184 |
| | | | 74/493 |
| 2017/0297607 A1* | 10/2017 | Orihara | B62D 1/192 |
| 2017/0305454 A1* | 10/2017 | Park | B62D 1/185 |

FOREIGN PATENT DOCUMENTS

| | | | | |
|---|---|---|---|---|
| DE | 102016224271 A1 * | 2/2017 | | B62D 1/20 |
| DE | 102016122573 A1 * | 6/2017 | | F16C 19/16 |
| JP | 5030744 B2 * | 9/2012 | | F16C 19/522 |
| JP | 5980992 B1 * | 8/2016 | | |
| JP | 3207410 U * | 11/2016 | | F16C 19/163 |
| WO | WO-0055028 A1 * | 9/2000 | | B62D 1/185 |
| WO | WO-2004033270 A1 * | 4/2004 | | B62D 1/185 |
| WO | WO-2004037627 A1 * | 5/2004 | | B62D 1/185 |
| WO | WO-2005070744 A1 * | 8/2005 | | B62D 1/185 |
| WO | WO-2009153417 A1 * | 12/2009 | | B62D 1/16 |
| WO | WO-2013002252 A1 * | 1/2013 | | B23Q 11/123 |

\* cited by examiner

|  |  |  | INNER SHAFT | | | | | |
|---|---|---|---|---|---|---|---|---|
|  |  |  | 59 | 60 | 61 | 59 | 60 | 61 |
|  |  | INDEX | 1A | 2A | 3A | 1B | 2B | 3B |
| OUTTER MEMBER | 59.5 | 1A | A |  | A |  | A |  |
|  | 60 | 1A |  | B |  | B |  | B |
|  | 60.5 | 1A | C |  | C |  | C |  |
|  | 61 | 1B | D |  | D |  | D |  |
|  | 59 | 1B |  | E |  | E |  | E |
|  | 60 | 1B | F |  | F |  | F |  |

FIG. 4

TELESCOPING ROLLER I-SHAFT AND METHOD OF ASSEMBLY

BACKGROUND OF THE INVENTION

The present disclosure relates to telescoping roller I-shafts, and more particularly to a roller I-shaft having a multitude of selectable bearing races.

Roller I-shafts, such as those used for telescoping steering column assemblies, may include an inner shaft surrounded by a hollow outer member or tube both extending along a common axis. The inner shaft includes an outer face that defines a plurality of axially extending grooves spaced circumferentially apart from one another. The outer member includes an inner face that defines a plurality of axially extending channels spaced circumferentially apart from one another. When the I-shaft is assembled, each one of the plurality of channels align with a respective one of the plurality of grooves, thereby forming a plurality of bearing races. A multitude of bearings are disposed in each bearing race for reducing friction as the inner shaft moves axially with respect to the outer member. Unfortunately, manufacturing tolerances may cause misalignment between the paired channels and grooves. Because of the misalignment, sizing of the bearings for proper telescoping operation may change from one bearing race to the next, and/or from one manufactured batch of inner and outer members to the next. The tailored sizing of bearing adds complexity and cost to the manufacturing process along with an undesired need to store a multitude of bearings ranching in many different sizes.

Accordingly, it is desirable to provide inner and outer members with bearing races that are more closely associated in size with a more limited variety of available bearing sizes.

SUMMARY OF THE INVENTION

In one exemplary and non-limiting embodiment of the present disclosure, a roller I-shaft includes an inner shaft, a hollow outer member, and a plurality of bearings. The inner shaft extends along an axis, and includes an outward face defining a plurality of first and second grooves that both extend axially and are alternately spaced circumferentially from one-another. The outer member is disposed radially outward from the inner shaft and includes an inward surface defining a plurality of first channels substantially aligned with the plurality of first grooves, and a plurality of second channels substantially aligned with the plurality of second grooves. The first grooves and the first channels form a plurality of first bearing races, and the second grooves and the second channels form a plurality of second bearing races. The plurality of bearings are disposed in a selected plurality of bearing races comprising one of the plurality of first bearing races and the plurality of second bearing races.

In another exemplary embodiment, a method of assembling a roller I-shaft indexing a plurality of grooves in an inner shaft, and indexing a plurality of channels in a hollow outer member. The plurality of grooves may then be selectably aligned to the plurality of channels base on manufacturing deviations and a pre-determined size of a plurality of bearings.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 is a table illustrating the various combinations based on measured dimensional deviations.

DETAILED DESCRIPTION

Referring now to the Figures, where the invention will be described with reference to specific embodiments, without limiting same, an extendable steering column assembly 20 is illustrated as one, non-limiting, example of an application for a telescoping, roller, I-shaft 22 that may not require use of more traditional springs. The roller I-shaft 22 is adapted to provide relatively frictionless telescoping capability while supporting various load conditions that may include rotational and torsional loading. It is contemplated and understood that the roller I-shaft may be used in any application and is not limited to the vehicle industry and/or steering column assemblies.

Figure 1:
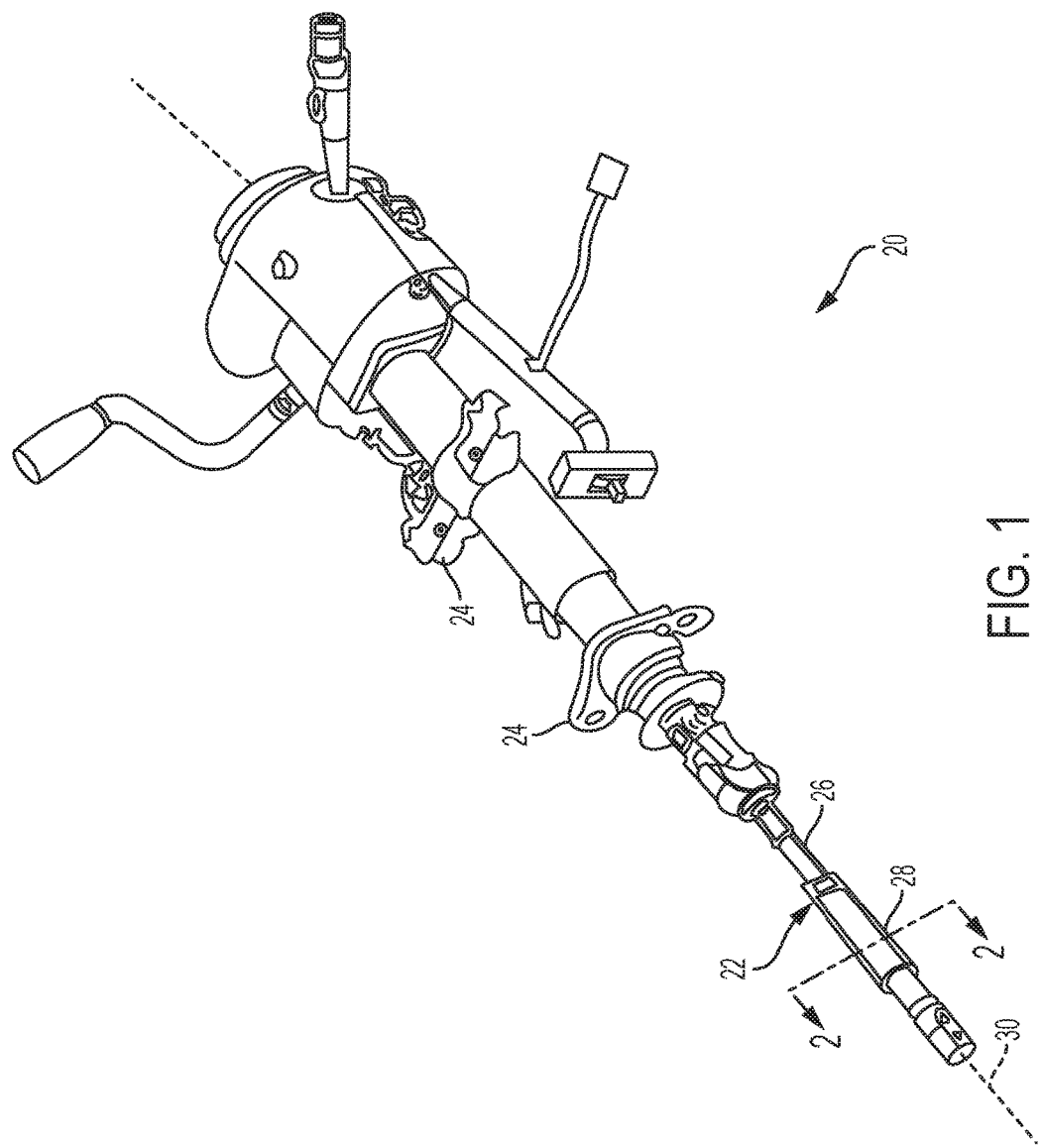
FIG. 1 is a side view of a steering column assembly in accordance with an exemplary embodiment of the present invention.
Figure 2:
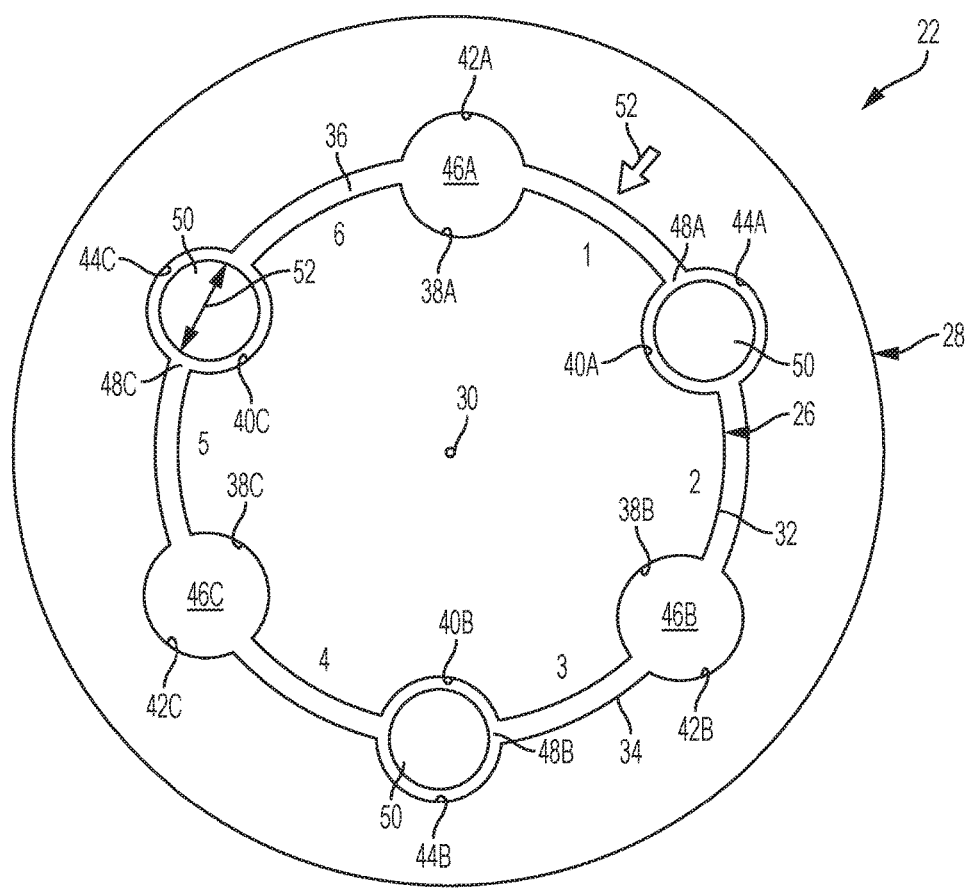
FIG. 2 is a cross section of a roller I-shaft of the steering column assembly viewing in the direction of arrows 2-2 in FIG. 1.

Referring to FIGS. 1 and 2, the steering column assembly 20 may include a support structure or bracket 24, an inner shaft 26 that may be a rotating steering shaft, and an outer member 28 that may be a shaft housing or jacket. The inner shaft 26 extends along an axis 30 and includes a face 32 that may be substantially cylindrical and faces radially outward. The outer member 28 may generally be hollow and/or includes a surface 34 that may be substantially cylindrical, faces radially inward and generally defines the boundaries of a bore 36 for axial receipt of the inner shaft 26. In an application of a steering shaft, a distal end of the inner shaft 26 may be splined for attachment of a steering wheel (not shown). The outer member 28 may be engaged to the bracket 24, which may be a pivotal engagement as is known to one having skill in the art.

Referring to FIG. 2, the outward face 32 of the inner shaft 26 may define the boundaries of a set or plurality of first grooves (i.e., three illustrated as 38A, 38B, 38C) and a set or plurality of second grooves (i.e., three illustrated as 40A, 40B, 40C. The first grooves 38A, 38B, 38C and the second grooves 40A, 40B, 40C substantially extend axially, and are spaced circumferentially apart from one-another in an alternating pattern. That is, groove 38A is circumferentially spaced between adjacent grooves 40C, 40A, groove 38B is circumferentially spaced between grooves 40A, 40B, and groove 38C is circumferentially spaced between grooves 40B, 40C. The grooves 38A, 38B, 38C, 40A, 40B, 40C may each be circumferentially spaced from the next adjacent groove by about sixty (60) degrees. It is further contemplated and understood that there may be more than two sets of grooves and each set may not be limited to three grooves.

The inward surface 34 of the outer member 28 may define the boundaries of a set or plurality of first channels (i.e., three illustrated as 42A, 42B, 42C) and a set or plurality of second channels (i.e., three illustrated as 44A, 44B, 44C.

The first channels 42A, 42B, 42C and the second channels 44A, 44B, 44C substantially extend axially, and are spaced circumferentially apart from one-another in an alternating pattern. That is, channel 42A is circumferentially spaced between adjacent channels 44C, 44A, channel 42B is circumferentially spaced between grooves 44A, 44B, and channel 42C is circumferentially spaced between channels 44B, 44C. The channels 42A, 42B, 42C, 44A, 44B, 44C may each be circumferentially spaced from the next adjacent channel by about sixty (60) degrees. It is further contemplated and understood that there may be more than two sets of channels and each set may not be limited to three channels.

When the roller I-shaft 22 is assembled, the first grooves 38A, 38B, 38C and the first channels 42A, 42B, 42C are generally paired to form a first set of bearing races 46A, 46B, 46C. More specifically, the groove 38A is in communication with (i.e., radially opposes) channel 42A to form bearing race 46A, groove 38B is in communication with channel 42B to form bearing race 46B, and groove 38C is in communication with channel 42C to form bearing race 46C. Similarly, the second grooves 40A, 40B, 40C and the second channels 44A, 44B, 44C are generally paired to form a second set of bearing races 48A, 48B, 48C. More specifically, the groove 40A is in communication with (i.e., radially opposes) channel 44A to form bearing race 48A, groove 40B is in communication with channel 44B to form bearing race 48B, and groove 40C is in communication with channel 44C to form bearing race 48C.

Figure 3:
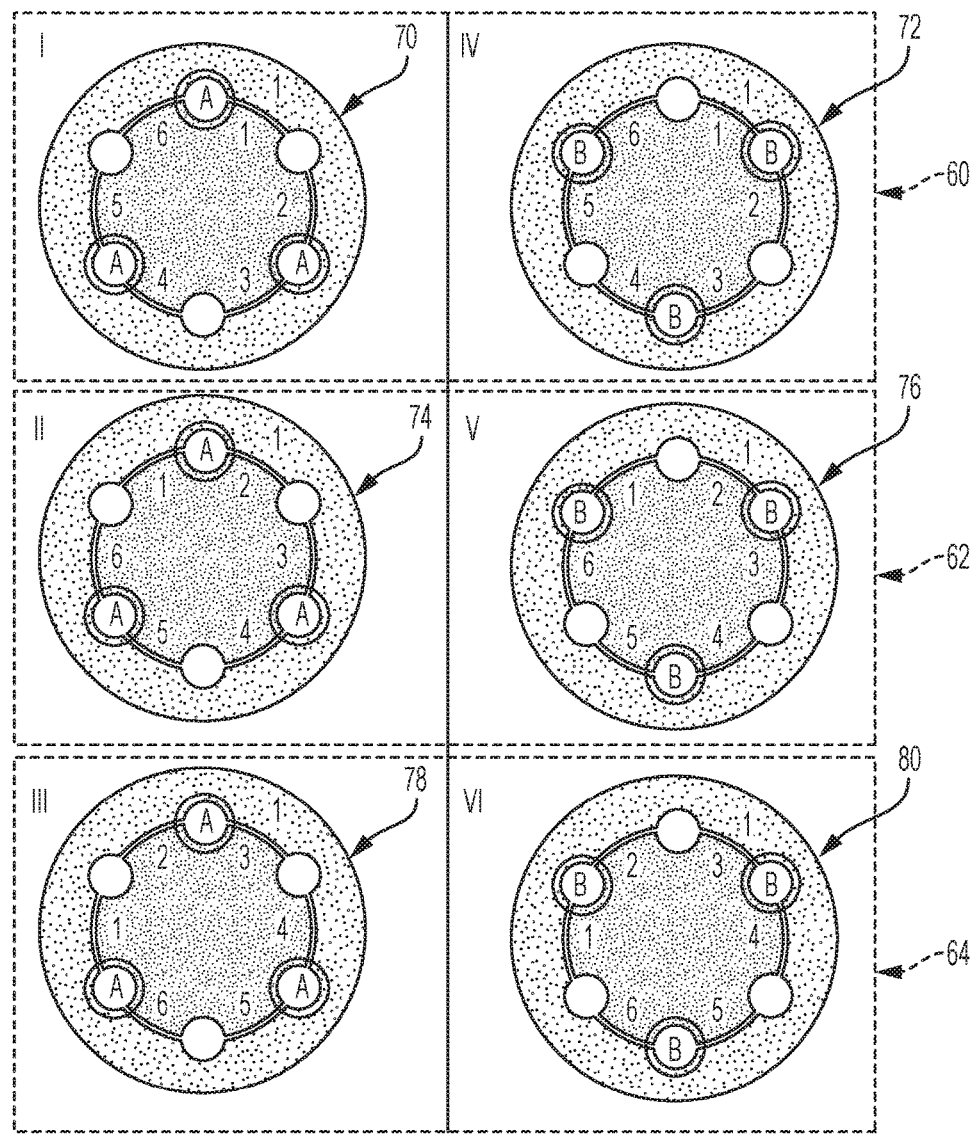
FIG. 3 is a schematic illustrating multiple combinations of inner shaft grooves and outer member channels of the roller I-shaft.

Referring to FIGS. 2 and 3, the roller I-shaft 22 may further include a plurality of bearings 50 that may be spherical, and may have a common and pre-determined diameter (see arrow 52 in FIG. 2). During assembly of the roller I-shaft 22, the bearings may be selectively located, as one example, in the first set of bearing races 46A, 46B, 46C or the second set of bearing races 48A, 48B, 48C, but not both sets. This selection of bearing location is generally based on manufacturing dimensional deviations between various combinations of grooves and channels (i.e., three combinations 60, 62, 64 illustrated in FIG. 3) that may be measured. The pattern of bearing distribution facilitates rotational motion between the inner shaft 26 and outer member 28 while distributing load (e.g., torque) and facilitating relatively frictionless telescopic motion between the inner shaft 26 and outer member 28.

Manufacturing of the inner shaft 26 and the outer member 28 may lead to tolerance limitations. That is, the dimensions and/or circumferential placement of the respective grooves 38A, 38B, 38C, 40A, 40B, 40C and channels 42A, 42B, 42C, 44A, 44B, 44C may include various dimensional deviations that are not ideal for use with bearings 50 having a common and relatively consistent diameter. The unwanted effects of dimensional deviations may be limited, or eliminated, during assembly of the I-shaft 22. More specifically, the grooves 38A, 38B, 38C, 40A, 40B, 40C may be indexed (see identifiers 1 through 6) that may be imprinted on the inner shaft 26. The outer member 28 may be similarly indexed and/or may include a point of origin. One example of a point of origin may be signified by an arrow, or other marking, 52 that may be imprinted on the outer member 28. It is contemplated and understood that indexing of the grooves and channels may take any form and may be simplified by including one marking on each of the inner shaft 26 and outer member 28.

During assembly and as part of a measuring process, the inner shaft 26 may be rotated by increments of about sixty (60) degrees in the present example. This rotation matches different grooves 38A, 38B, 38C, 40A, 40B, 40C to different channels 42A, 42B, 42C, 44A, 44B, 44C. The combination 60, 62, 64 of grooves and channels will form potential choices (i.e., six choices 70, 72, 74, 76, 78, 80 illustrated in FIG. 3) for bearing races 46A, 46B, 46C, 48A, 48B, 48C with the desired pattern previously described. The resulting bearing races for each combination 60, 62, 64 of grooves and channels may be measured to determine which set of bearing races, if any for a particular combination, is best suited for use with the bearings 50 and the associated bearing diameter 52. The three combinations 60, 62, 64 of grooves and channels each lead to two selections of bearing races, thus providing the total of six choices 70, 72, 74, 76, 78, 80 for bearing placement. Although six choices of bearing placement are illustrated in FIG. 3, it is contemplated and understood that with the illustrated number of grooves and channels, there may be up to six combinations that may then lead to twelve choices. The number of potential combinations that may each require measurement may be dependent upon the manufacturing technique and the dimensional deviations that such a technique may produce.

Referring to FIG. 4, one example of a measured inner shaft 26 and outer member 28 is illustrated. In this example, the angular distance between the grooves 38A, 38B, 38C, 40A, 40B, 40C of the inner shaft 26, and the channels 42A, 42B, 42C, 44A, 44B, 44C of the outer member 28 is measured and charted. The various sets of bearing races are signified in the chart as "A" and "B" for one combination, "C" and "D" for another combination, and "E" and "F" for yet a third combination. Depending upon measured results, one of the bearing race sets or choices I, II, III, IV, V, VI is chosen to carry the bearings 50. It is further contemplated and understood that the inner shafts 26 and outer member 28 may be mass produced and/or manufactured in large batches that tend to produce the same dimensional deviations from one part to the next. Because of this, measuring one or a selected few of the total batch may suffice. Since each part is indexed, once the channel and groove combinations are established and bearing race set is selected, the remaining I-shafts 22 may be assembled without the need of further, and potentially time consuming, measurements.

Figure 5:
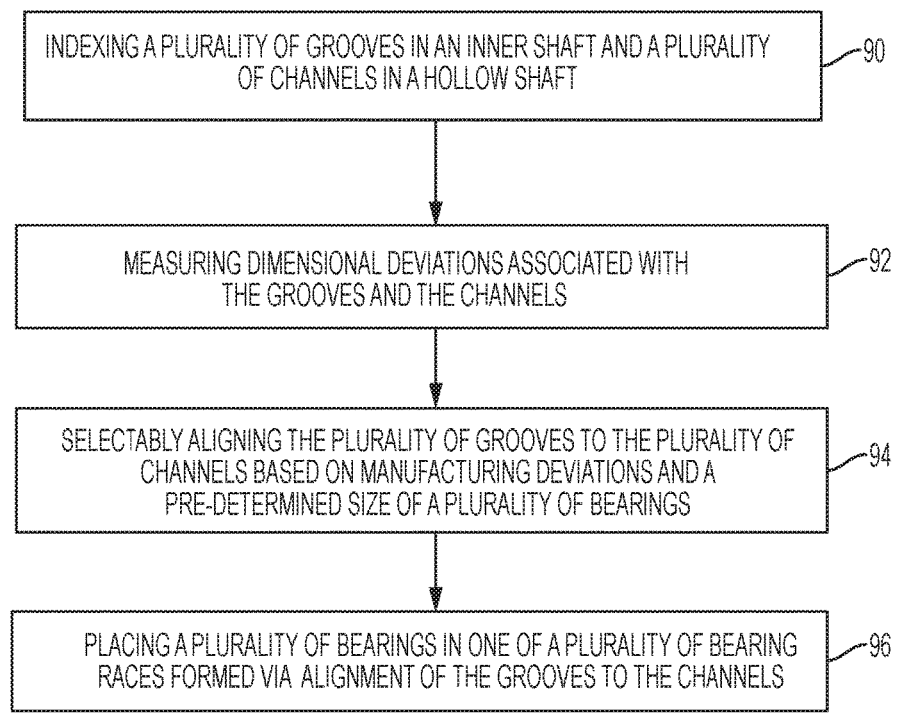
FIG. 5 is a flow chart of a method of assembling the roller I-shaft.

Referring to FIG. 5, a method of assembling a roller is illustrated. In block 90, the plurality of grooves 38A, 38B, 38C, 40A, 40B, 40C of the inner shaft 26, and the plurality of channels 42A, 42B, 42C, 44A, 44B, 44C of the outer member 28 are indexed for reference to circumferential positioning. In block 92, dimensional deviations associated for both the grooves 38A, 38B, 38C, 40A, 40B, 40C and channels 42A, 42B, 42C, 44A, 44B, 44C are measured and recorded. In block 94, the grooves 38A, 38B, 38C, 40A, 40B, 40C and channels 42A, 42B, 42C, 44A, 44B, 44C are selectably aligned or paired based on the dimensional measurement and a pre-established size of the bearings 50. In block 96, the bearings 50 are placed in a selected set of bearing races ideally suited for the common size (e.g., diameter 52) of the bearings 50.

Benefits and advantages of the present disclosure include a decrease in inventory costs by alleviating the need for stocking multiple bearing sizes. Moreover, because of the bearing race angular orientations, only two races of ball bearings are loaded during normal "low torque" use, thus shaft stroke loads may be reduced. During high torque/load conditions, the third race of bearings may be loaded, thus increasing contact area leading to a reduction in wear but an increase in stroke load. Other advantages may include an increase in torsional stiffness with a negligible increase in stroke load.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A roller I-shaft comprising:
an inner shaft extending along an axis, the inner shaft including an outward face defining a plurality of first grooves and a plurality of second grooves, both extending axially and alternately spaced circumferentially from one-another;
a hollow outer member disposed radially outward from the inner shaft and including an inward surface defining a plurality of first channels aligned selectably with one of the plurality of first grooves and the plurality of second grooves, and a plurality of second channels substantially aligned selectably with the other of the plurality of first grooves and the plurality of second grooves, wherein the plurality of first grooves and the selected one of the plurality of first and second channels form a plurality of bearing races and the plurality of second grooves and the selected other of the plurality of first and second channels form a plurality of bearing-less races; and
a plurality of bearings disposed in the plurality of bearing races, wherein the plurality of bearing races includes three bearing races.

2. The roller I-shaft set forth in claim 1, wherein the inner and hollow outer members are constructed and arranged to move telescopically with respect to one-another.

3. The roller I-shaft set forth in claim 2, wherein a multitude of bearings of the plurality of bearings is disposed in each one of the plurality of bearing races.

4. The roller I-shaft set forth in claim 1, wherein the plurality of bearing races is selected over the plurality of bearing-less races to contain the plurality of bearings based upon manufacturing tolerance alignment.

5. A roller I-shaft comprising:
an inner shaft extending along an axis, the inner shaft including an outward face defining a plurality of first grooves and a plurality of second grooves, both extending axially and alternately spaced circumferentially from one-another;
a hollow outer member disposed radially outward from the inner shaft and including an inward surface defining a plurality of first channels aligned selectably with one of the plurality of first grooves and the plurality of second grooves, and a plurality of second channels substantially aligned selectably with the other of the plurality of first grooves and the plurality of second grooves, wherein the plurality of first grooves and the selected one of the plurality of first and second channels form a plurality of bearing races and the plurality of second grooves and the selected other of the plurality of first and second channels form a plurality of bearing-less races; and
a plurality of bearings disposed in the plurality of bearing races, wherein the plurality of bearing races is selected over the plurality of bearing-less races to contain the plurality of bearings based upon manufacturing tolerance alignment, and wherein the plurality of bearing races includes three bearing races.

6. The roller I-shaft set forth in claim 5, wherein the plurality of bearing-less races includes three bearing-less races.

7. The roller I-shaft set forth in claim 1, wherein the plurality of bearing races consists of three bearing races.

8. The roller I-shaft set forth in claim 7, wherein the plurality of bearing-less races consists of three bearing-less races.

9. The roller I-shaft set forth in claim 1, wherein each one of the plurality of bearing races is circumferentially disposed between and directly adjacent to two bearing-less races of the plurality of bearing-less races.

10. The roller I-shaft set forth in claim 1, wherein each one of the plurality of bearing races is circumferentially spaced from an adjacent one of the plurality of bearing-less races by about sixty degrees.

11. The roller I shaft set forth in claim 1, wherein the plurality of bearing races equals the plurality of bearing-less races.

12. The roller I-shaft set forth in claim 1, wherein the roller I-shaft is a steering column, telescoping, roller I-shaft.

13. A roller I-shaft comprising:
a plurality of bearings;
an inner shaft extending along an axis, the inner shaft including an outward face defining a plurality of grooves extending axially and spaced circumferentially from one-another; and
a hollow outer member disposed radially outward from the inner shaft and including an inward surface defining a plurality of channels substantially aligned with one of the plurality of grooves, wherein each one of the plurality grooves is circumferentially aligned with a respective one of the plurality of channels to fo ni a race of a multitude of races, and the multitude of races including a plurality of bearing races selected to contain the plurality of bearings and a plurality of bearing-less races selected not to contain the plurality of bearings, wherein each one of the plurality of bearing races is disposed circumferentially adjacent to a respective one of the plurality of bearing-less races, and the plurality of bearing races selected from the multitude of races to contain the plurality of bearings is based on dimensional tolerances.

14. The roller I-shaft set forth in claim 13, wherein the plurality of bearings are in direct rolling contact with at least one of the outward face and the inward surface.

* * * * *